US011401887B2

(12) United States Patent
Gonidec et al.

(10) Patent No.: US 11,401,887 B2
(45) Date of Patent: Aug. 2, 2022

(54) MEMBRANE THRUST INVERTER FOR AN AIRCRAFT PROPULSION UNIT

(71) Applicant: Safran Nacelles, Gonfreville l'Orcher (FR)

(72) Inventors: Patrick Gonidec, Gonfreville l'Orcher (FR); Olivier Kerbler, Gonfreville l'Orcher (FR); Alexandre Phi, Gonfreville l'Orcher (FR); Jean-Paul Rami, Gonfreville l'Orcher (FR); Stephane Tirel, Gonfreville l'Orcher (FR); Jean-Baptiste Goulard, Gonfreville l'Orcher (FR); Matthieu Vanderlinden, Les Andelys (FR); Arnaud Carles-Espiteau, Saleilles (FR)

(73) Assignee: Safran Nacelles, Gonfreville l'Orcher (FR)

( * ) Notice: Subject to any disclaimer, the term of this patent is extended or adjusted under 35 U.S.C. 154(b) by 125 days.

(21) Appl. No.: 16/930,524

(22) Filed: Jul. 16, 2020

(65) Prior Publication Data
US 2020/0347800 A1    Nov. 5, 2020

Related U.S. Application Data

(63) Continuation of application No. PCT/FR2019/050071, filed on Jan. 14, 2019.

(30) Foreign Application Priority Data

Jan. 16, 2018 (FR) ..................................... 18/50361

(51) Int. Cl.
*F02K 1/72* (2006.01)
*F02K 1/64* (2006.01)
(Continued)

(52) U.S. Cl.
CPC ................. *F02K 1/72* (2013.01); *B64D 29/06* (2013.01); *F02K 1/625* (2013.01); *F02K 1/645* (2013.01); *F02K 1/763* (2013.01)

(58) Field of Classification Search
CPC . F02K 1/72; F02K 1/625; F02K 1/645; F02K 1/763; B64D 29/06
See application file for complete search history.

(56) References Cited

U.S. PATENT DOCUMENTS 3,599,432 A * 8/1971 Ellis ..................... F02K 1/645
60/230
2012/0138707 A1* 6/2012 Vauchel ................. F02K 1/763
239/265.29

FOREIGN PATENT DOCUMENTS

DE    102008022271    11/2009
DE    102013225043    6/2015

OTHER PUBLICATIONS

International Search Report for International Application PCT/FR2019/050071, dated May 14, 2019.

* cited by examiner

*Primary Examiner* — Andrew H Nguyen
(74) *Attorney, Agent, or Firm* — Burris Law, PLLC (57) ABSTRACT

An improved thrust reverser for an aircraft propulsion assembly includes redirection of the air flow for performing the thrust reversal by one or more closure membranes, i.e. by thin and flexible structures deployed across the propulsion assembly. The improved thrust reverser includes at least one closure membrane arranged to deflect at least one portion of the air flow in the direction of the evacuation structure when the thrust reverser is in the reverse jet position and an intermediate structure movable in rotation relative to the fixed structure.

6 Claims, 9 Drawing Sheets

(51) Int. Cl.
*B64D 29/06* (2006.01)
*F02K 1/62* (2006.01)
*F02K 1/76* (2006.01)

MEMBRANE THRUST INVERTER FOR AN AIRCRAFT PROPULSION UNIT

CROSS-REFERENCE TO RELATED APPLICATIONS

This application is a continuation of International Application No. PCT/FR2019/050071, filed on Jan. 14, 2019, which claims priority to and the benefit of FR 18/50361 filed on Jan. 16, 2018. The disclosures of the above applications are incorporated herein by reference.

FIELD

The present disclosure relates to the field of aircraft propulsion units of the type comprising a nacelle, a bypass turbojet engine and a thrust reverser. The present disclosure concerns more specifically the thrust reverser of an aircraft propulsion unit.

BACKGROUND

The statements in this section merely provide background information related to the present disclosure and may not constitute prior art.

There are known in the prior art thrust reversers with blade cascades. The thrust reversal function consists in redirecting all or part of one or both of the air flows circulating in the aircraft propulsion unit towards the front so as to create a counterthrust contributing to the braking of the aircraft. When the turbojet engine is a bypass turbojet engine, the redirected air flow is generally either that circulating in the secondary flow path or all of the two mixed flows. Typically, the thrust reversal is carried out using inner flaps in the secondary flow path provided for switching between a "reverse jet" position and a "direct jet" position. In the direct jet, the flaps are retracted or folded so as not to interfere with the air flow circulating in the secondary flow path. In the direct jet, this air flow thus participates in the thrust of the aircraft. In the reverse jet, the flaps are deployed so as to at least partially close the secondary flow path, thereby diverting at least one portion of the air flow towards a radial opening of the nacelle. The radial opening is equipped with the blade cascades which are arranged to direct the air flow thus deflected towards the front of the aircraft.

To ensure the displacement of the flaps from the direct jet position to the reverse jet position and vice versa, each flap is connected on the one hand to a movable structure of the nacelle, typically a thrust reverser cowl ("transcowl"), and on the other hand to a connecting rod itself connected to a fixed structure of the nacelle. The translation of the movable structure relative to the fixed structure thus displaces the flaps from one position to another via the connecting rods.

One issue with this type of thrust reverser is linked to the presence of the connecting rods which, in the direct jet, extend through the secondary flow path. The connecting rods therefore introduce aerodynamic disturbances, which reduces the efficiency of the aircraft propulsion unit in the direct jet position.

In addition, the multiple flaps and connecting rods constitute a complex and costly mechanism in terms of assembly and maintenance.

Thrust reversers with rear doors provided to redirect both the cold air flow and the hot air flow generated by the aircraft propulsion unit are known in the prior art. To do this, the thrust reverser typically comprises two doors at the rear of the nacelle pivotally mounted between a direct jet position in which the doors constitute a nozzle of the aircraft propulsion unit and a reverse jet position in which the doors form obstacles to redirect the double flow forwards the aircraft propulsion unit via a radial opening of the nacelle. This radial opening may include blade cascades.

In a thrust reverser with doors, the efficiency of the thrust reverser and the performance of the direct jet propulsion unit are generally antagonistic.

In addition, a thrust reverser with doors comprises mechanisms for actuating relatively heavy doors which increase the overall mass of the aircraft propulsion unit.

SUMMARY

This section provides a general summary of the disclosure and is not a comprehensive disclosure of its full scope or all of its features.

The present disclosure provides a thrust reverser and an aircraft propulsion unit capable of limiting or canceling the aerodynamic disturbances linked to the presence of the thrust reverser when the aircraft is flying at cruising speed.

The present disclosure relates to a thrust reverser for an aircraft propulsion unit, comprising an evacuation structure provided with one or more openings, a movable structure and a fixed structure. The movable structure and the fixed structure delimit a flow path capable of channeling an air flow in a longitudinal direction when the thrust reverser is in a direct jet position. The movable structure is movable between the direct jet position and a reverse jet position providing a radial evacuation of at least one portion of the air flow through the evacuation structure.

According to a form of the present disclosure, a remarkable fact about the thrust reverser is that it comprises at least one closure membrane arranged to deflect at least one portion of the air flow towards the evacuation structure when the thrust reverser is in the reverse jet position.

In at least one form of the present disclosure, the evacuation structure comprises blade cascades.

The expression "membrane" means a thin structure of small thickness relative to the surface of the deployed closure membrane, and a flexible structure, that is to say allowing the closure membrane to be folded under the effect of an applied compressive stress in a direction tangential to its surface.

The closure membrane in one form comprises, or is made of a material allowing it to resist a tensile stress applied in a direction tangential to its surface.

In one form of the present disclosure, the closure membrane can comprise an elastic material so that it can be reversibly deformed (or elastically deformed) under the effect of a tensile stress. Typically, the closure membrane can be manufactured so that its relative elongation value can vary from 0 to 50%, or even from 0 to 100% relative to its surface when it is not tensile stressed.

Of course, the material of the closure membrane and/or its dimensions, in particular its thickness and/or its surface, should be selected so that the stresses exerted on the closure membrane during the implementation of the thrust reverser do not cause any irreversible deformation (or plastic deformation) or rupture of the membrane.

The closure membrane, in one form is impermeable to fluids (liquid, gas, plasma).

At least one portion of the closure membrane, in one form is air permeable and for this purpose comprises pores to contribute to the acoustic treatment of the thrust reverser, in particular, where appropriate, one portion of the closure membrane is exposed to the secondary air flow when the reverser is positioned in a direct jet position. In this case, the porosity rate/density, which depends on the size of the pores and the thickness of the closure membrane, must nevertheless allow the closure membrane to perform its function of flow deflection.

In another form of the present disclosure, the closure membrane comprises, or a variation consists of, a textile material.

In yet another form of the present disclosure, the closure membrane is manufactured by weaving or knitting or molding or extrusion or rolling.

In other forms, the closure membrane comprises elastomers and/or rubber and/or polymers and/or polyamides, for example nylon, and/or carbon fibers and/or polytetrafluoroethylene (PTFE) and/or silicone and/or poly(p-phenylene terephthalamide) (PPD-T) and/or chlorosulfonated polyethylene (CSM).

In variations of the present disclosure, the closure membrane is selected or manufactured having anti-friction properties on solid, and/or having adhesion properties on the wall, and/or acoustically transparent or semi-transparent, and/or resistant to temperatures comprised between $-100°$ C. and $750°$ C. for typical cruising times of an airliner type aircraft.

These properties may be inherent in the material or be provided by a surface treatment or by the addition of a layer of material.

The closure membrane may comprise reinforcement fibers, and in one form, the reinforcement fibers can be arranged in a direction parallel or substantially parallel to the longitudinal direction when the closure membrane is retracted, that is to say when the thrust reverser is in the direct jet position.

In one form of the present disclosure, the closure membrane comprises reinforcements such as cables or slats which constitute all or part of the reinforcement fibers.

In one form of the present disclosure, the closure membrane comprises reinforcing elements such as reinforcement fibers and/or wires and/or cables and/or ribbons and/or slats. The reinforcing elements may not be interconnected, and/or extend in a first direction so that these reinforcing elements are at least partially spaced apart in a second direction perpendicular to the first direction. The second direction can be a transverse direction of the membrane.

To improve the mechanical resistance of the closure membrane and/or its maintenance during the implementation of the thrust reverser and/or to facilitate or allow its fixing, the closure membrane may alternatively or additionally comprise other types of reinforcing or fixing elements such as inserts or even one or more wefts.

According to a first aspect of the present disclosure, the closure membrane can be deployed in the flow path according to the principle of a diaphragm.

To do this, generally, the thrust reverser comprises an intermediate structure movable in rotation relative to the fixed structure about an axis coincident with the longitudinal direction. One portion of the closure membrane can be fixed to the fixed structure. Another portion of the membrane can be fixed to the intermediate structure.

In one form of the present disclosure, the movable structure is movable in translation between the direct jet position and a reverse jet position.

In another form of the present disclosure, the intermediate structure can cooperate with the movable structure of the thrust reverser so that the displacement of the movable structure from the direct jet position to the reverse jet position, and/or from the reverse jet position to the direct jet position drives the intermediate structure in rotation about the axis coincident with the longitudinal direction.

To this end, the thrust reverser may comprise a rack system. The intermediate structure can cooperate with the movable structure by this rack system.

In yet another form of the present disclosure, the thrust reverser may comprise an actuation device, for example of the electric or hydraulic motor type, arranged to drive the intermediate structure in rotation about the axis coincident with the longitudinal direction.

Thus, the rotation of the intermediate structure can be controlled by a first actuation device independent of a second actuation device provided for controlling the translation of the movable structure.

The first and second actuation devices can be simultaneously or successively implemented. For example, the rotation of the intermediate structure can be performed after partial or total translation of the movable structure.

Thus, the rotation of the intermediate portion and the translation of the movable structure can be decoupled in terms of control while being synchronized. In other words, it is possible to mechanically or electrically synchronize the rotation of the intermediate portion and the translation of the movable structure.

According to a second aspect, the closure membrane can be deployed in the flow path by constricting one portion of the membrane.

In one form, the thrust reverser may comprise one or more holding elements respectively secured to one or more portions of the membrane. The holding element(s) can be movable in translation in a respective radial direction between a folded position, in which the closure membrane does not close the flow path, and a closure position in which the closure membrane is arranged to deflect at least one portion of the air flow in the direction of the evacuation structure. When the thrust reverser is in the reverse jet position, the holding element(s) are in the closure position.

The present disclosure also concerns an aircraft propulsion unit comprising such a thrust reverser.

Relative to thrust reversers with flaps or rear doors, the present disclosure makes it possible to cancel or limit the aerodynamic disturbances in the aircraft propulsion unit at cruising speed, while providing the acoustic treatment of the aircraft propulsion unit.

The present disclosure also makes it possible to simplify the design and manufacture of the thrust reverser in particular due to the reduction in the number of parts relative to thrust reversers with flaps or rear doors. Flaps, connecting rods and other elements such as fairings at the end of the connecting rod are removed. The locking and actuation mechanisms are also simplified.

In addition, the closure of the flow path by a closure membrane improves the resistance to the pressure forces exerted by the air flow by allowing a better distribution of these on the membrane.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
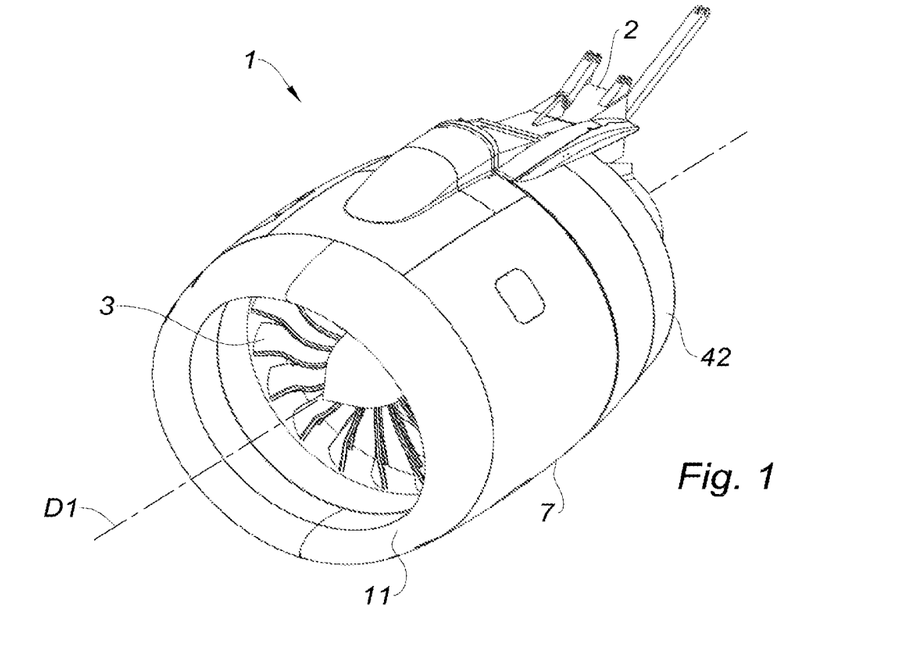
FIG. 1 is a schematic perspective view of an aircraft propulsion unit with a blade cascades thrust reverser, in a direct jet position, in accordance with teachings of the present disclosure.

An aircraft propulsion unit 1 is illustrated in FIG. 1. This aircraft propulsion unit 1 comprises a nacelle, an engine pylon 2 and a bypass turbojet engine type engine (not represented) housed in the nacelle. The engine pylon 2, partially represented, is configured to be fixed to a wing (not represented) or to the fuselage (not represented) of the aircraft.

The nacelle comprises an air inlet 11 adapted to improve air capture toward the turbojet engine of the air for the supply of a fan 3 and of inner compressors (not represented) of the turbojet engine.

The aircraft propulsion unit 1 extends in a longitudinal direction D1 represented coincident with the axis of the engine.

Figure 2:
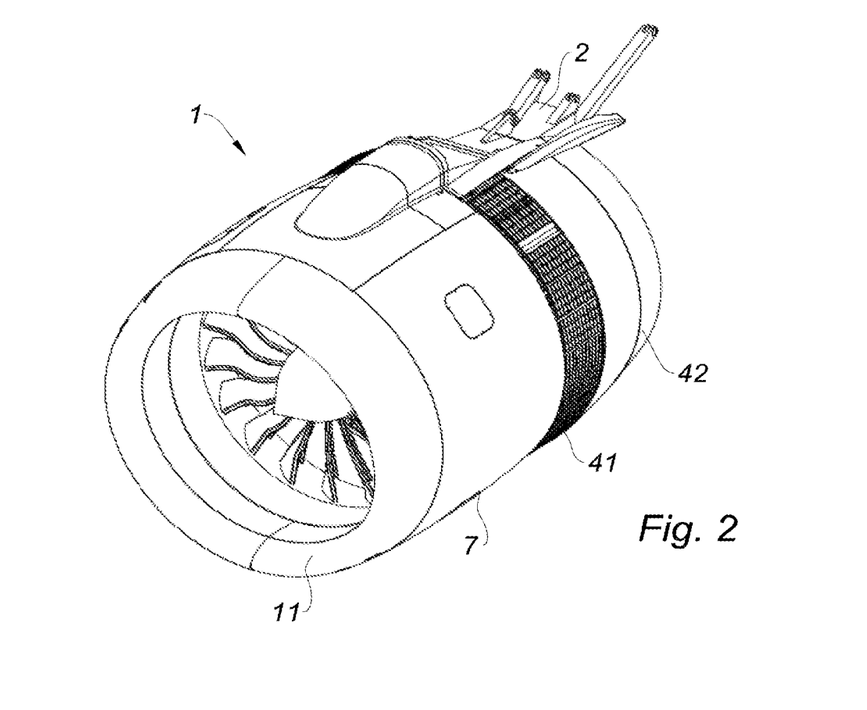
FIG. 2 is a schematic perspective view of the aircraft propulsion unit of FIG. 1 in which the thrust reverser is in a reverse jet position.

FIGS. 1 and 2 illustrate the aircraft propulsion unit 1 with a thrust reverser respectively in the "direct jet" position and in the "reverse jet" position.

The thrust reverser includes an evacuation structure of the blade cascades type 41 and a movable structure 42.

The movable structure 42 is in this example a cowl movable in translation between the direct jet position and the reverse jet position.

The translation of the movable structure 42 is typically carried out by sliding of this movable structure 42 along rails (not represented) secured to the engine pylon 2 and disposed on either side thereof.

Figure 3:
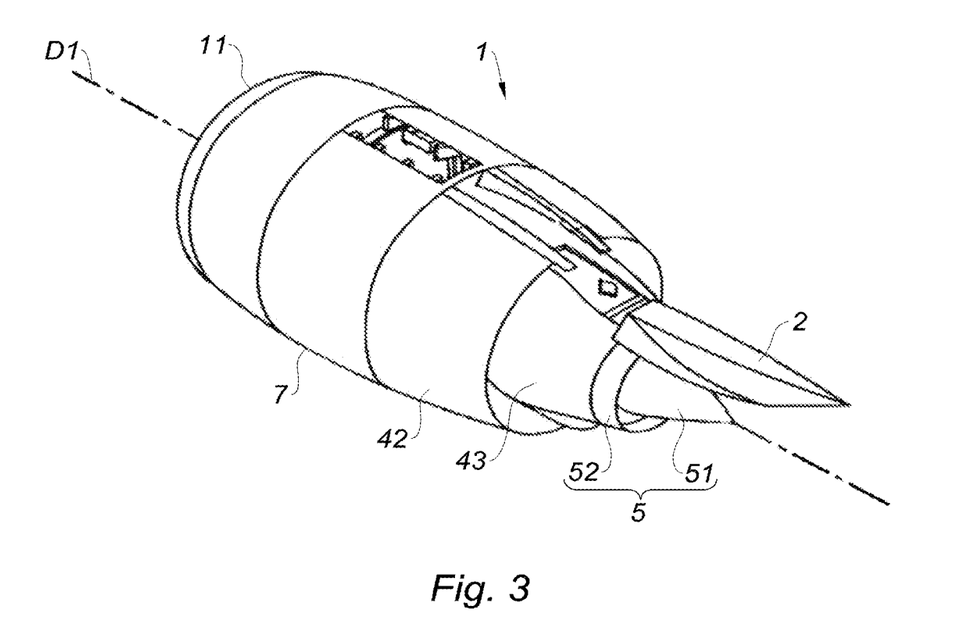
FIG. 3 is a schematic perspective view of an aircraft propulsion unit with a blade cascades thrust reverser, in a direct jet position.

FIG. 3 shows an aircraft propulsion unit 1 similar to that of FIG. 1 from a perspective showing an exhaust nozzle 5 downstream of the turbojet engine. The exhaust nozzle 5 comprises a gas ejection cone 51 ("plug") and a primary nozzle 52 ("nozzle"). The ejection cone 51 and the primary nozzle 52 of the exhaust nozzle 5 define a passage for a hot air flow exiting the turbojet engine.

The primary nozzle 52 is secured to a fixed structure 43 of the thrust reverser. The portion of the fixed structure 43 represented in FIG. 3 is also called the inner fixed structure.

The inner fixed structure 43 and the movable structure 42 of the thrust reverser delimit a flow path capable of channeling an air flow in the longitudinal direction D1 when the thrust reverser is in the direct jet position illustrated in FIGS. 1 and 3.

The air flow circulating in this flow path, also called secondary flow path, is a cold air flow from the turbojet engine.

A hot air flow from the turbojet engine is evacuated from the aircraft propulsion unit by the exhaust nozzle 5.

With reference to FIG. 2, the reverse jet position of the thrust reverser authorizes a radial evacuation of the cold air flow through the evacuation structure 41.

In certain forms, the reverse jet position allows a radial evacuation through the evacuation structure 41 of both the cold air flow and the hot air flow.

In what follows, the expression "blade cascades" may be replaced by the expression "evacuation structure."

Figure 4:
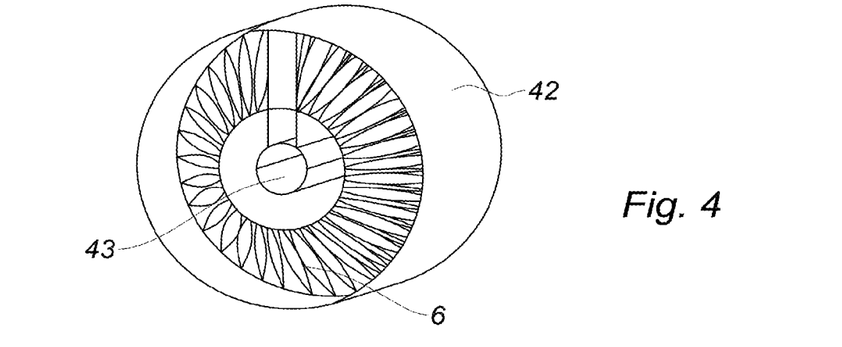
FIG. 4 is a schematic perspective view of a thrust reverser showing a closure membrane, in accordance with teachings of the present disclosure.

In order to deflect at least one portion of this air flow in the direction of the blade cascades 41 when the thrust reverser is in the reverse jet position, the thrust reverser comprises a closure membrane 6, for example such as that schematically illustrated in FIG. 4.

The description which follows describes several non-limiting examples of arrangement of one or more closure membranes 6 in accordance with the present disclosure.

In the examples of FIGS. 4 and 9 to 14, the closure membrane(s) 6 are arranged to evacuate only the cold air flow circulating in the secondary flow path. In the examples of FIGS. 15 to 19, the closure membrane(s) 6 are arranged to evacuate both the cold air flow and the hot air flow. The redirection of the two air flows, by comparison with the forms where only the cold air flow is redirected, involves deploying the closure membrane(s) 6 downstream of the inner fixed structure 43. Consequently, the principles of deployment and retraction of the closure membrane(s) 6 described with reference to a form in which only the cold flow is redirected can be applied to forms in which the two hot and cold air flows are redirected. Thus, for example, the thrust reversers of FIGS. 5 to 8 comprise deployment and retraction mechanisms for one or more closure membrane(s) 6, which can be used to redirect one or both flows of the turbojet engine. The inner fixed structure not represented on these figures can be axially located at the level of the closure membrane(s) 6 or upstream thereof.

In what follows, unless otherwise stated, the air flow or the portion of the diverted or redirected air flow can be all or part of the cold air flow or all or part of the hot and cold air flows.

Generally, at least one closure membrane 6 is arranged to deflect at least one portion of the air flow towards the blade cascades 41 when the thrust reverser is in the reverse jet position.

Figure 5:
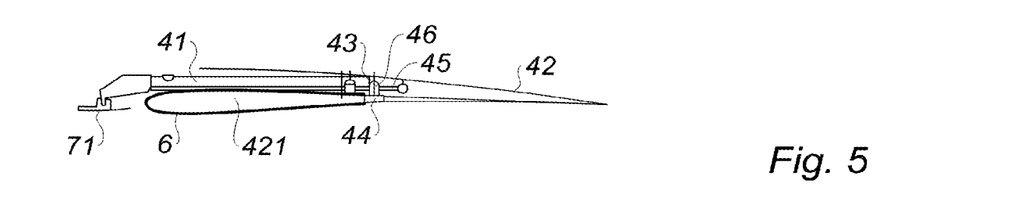
FIG. 5 is a schematic and partial view in longitudinal section of a thrust reverser in a direct jet position, with mechanical drive of the closure membrane, in accordance with teachings of the present disclosure.
Figure 6:
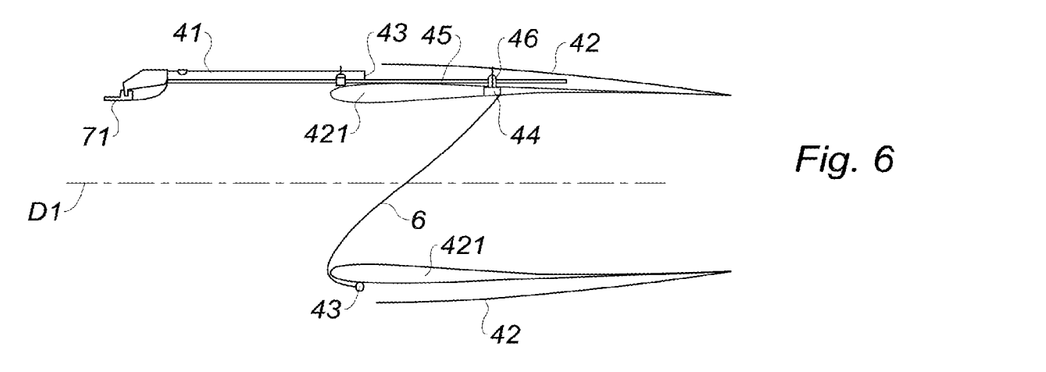
FIG. 6 is a schematic and partial view in longitudinal section of the thrust reverser of FIG. 5 in a reverse jet position.

FIGS. 5 and 6 schematically and partially show a thrust reverser according to the present disclosure in longitudinal section.

Figure 11:
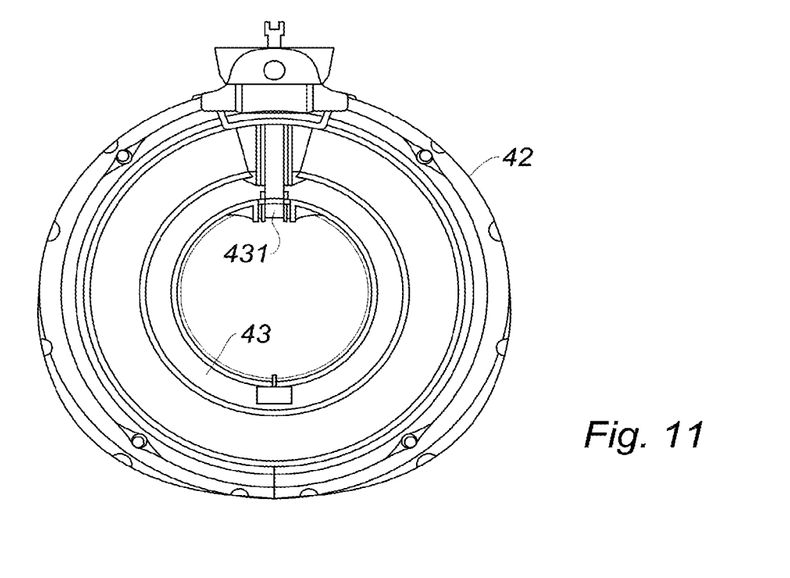
FIG. 11 schematically represents a front view of a thrust reverser in a direct jet position, in accordance with teachings of the present disclosure.
Figure 12:
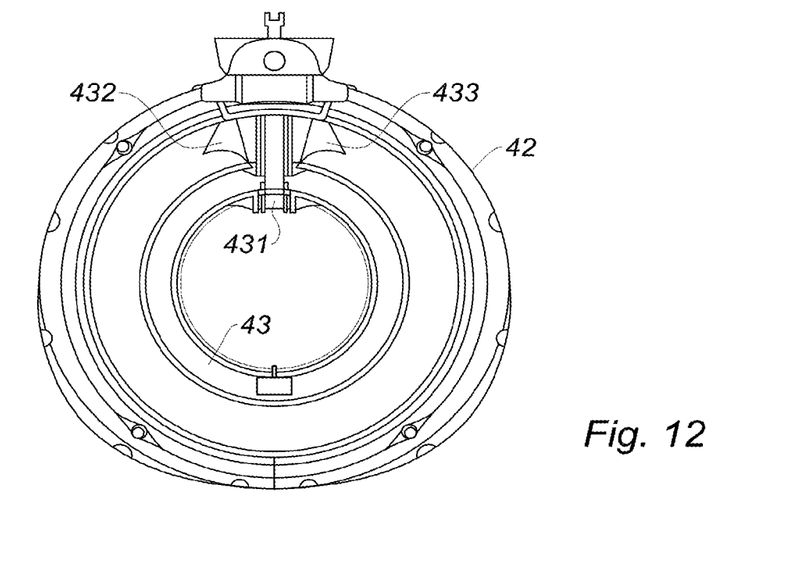
FIG. 12 schematically represents a front view of the thrust reverser in an intermediate jet position, in accordance with teachings of the present disclosure.
Figure 13:
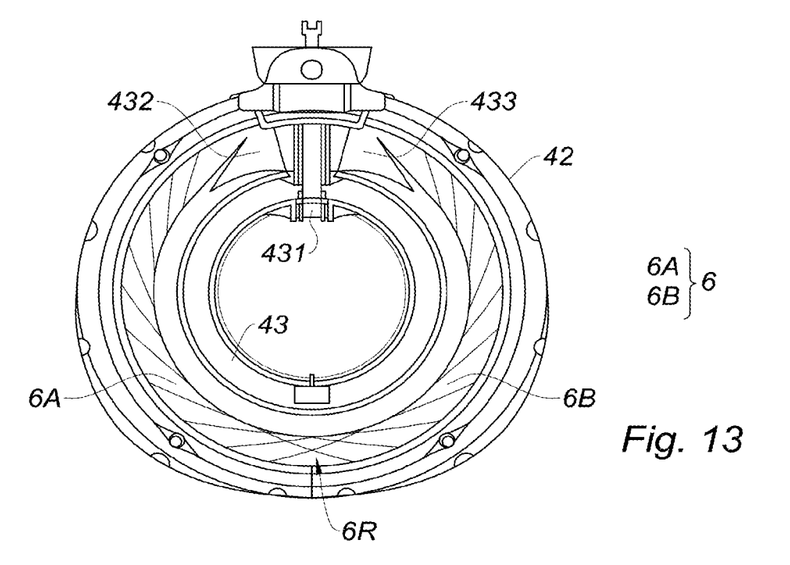
FIG. 13 schematically represents a front view of the thrust reverser in another intermediate jet position, in accordance with teachings of the present disclosure.

FIGS. 11 to 14 schematically show the thrust reverser in front view in different successive configurations. The thrust reverser is represented in the direct jet position in FIG. 11 and in the reverse jet position in FIG. 14. FIGS. 12 and 13 show the thrust reverser in intermediate positions between the direct jet position and the reverse jet position.

Figure 14:
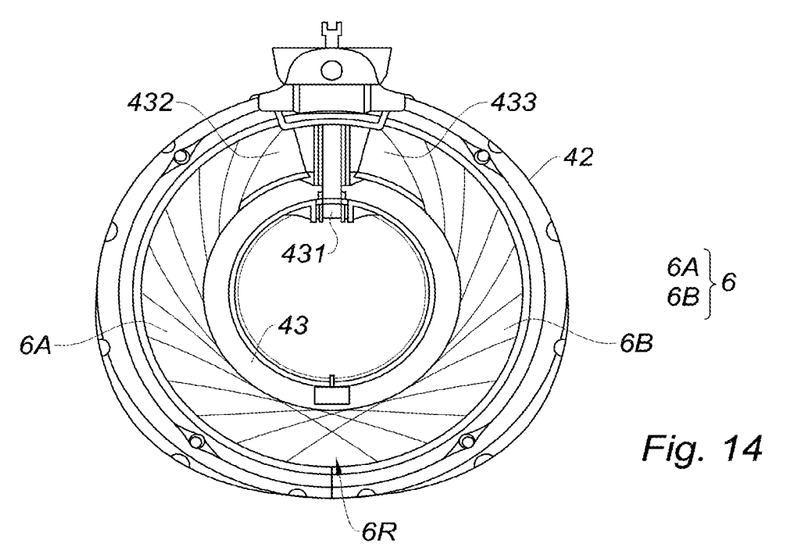
FIG. 14 schematically represents a front view of the thrust in a reverse jet position.

In the example of FIGS. 11 to 14, the thrust reverser comprises two closure membranes 6A and 6B (hereinafter also designated by the common reference 6) arranged to deflect at least one portion of the cold air flow in the direction of the blade cascades 41 when the thrust reverser is in the reverse jet position (see FIG. 14). In FIGS. 11 and 12, these closure membranes are retracted in the sense that they are not deployed in the secondary flow path. In FIG. 13, the closure membranes 6A and 6B are partially deployed in the flow path. In FIG. 14, the closure membranes 6A and 6B are deployed in the secondary flow path.

In the form of FIGS. 5 and 6, the blade cascades 41, the movable structure 42, a portion of the fixed structure 43 of the thrust reverser as well as an element 71 of an intermediate section 7 of the nacelle, the intermediate section 7 being visible in FIGS. 1 to 3 are in particular represented. In these FIGS. 5 and 6, only an outer portion of the fixed structure 43 is illustrated. In these FIGS. 5 and 6, the inner portion of the fixed structure 43, that is to say that represented in FIG. 3 called inner fixed structure, is not represented. According to these forms, the inner fixed structure can be axially located, that is to say in the direction D1, either at the level of the closure membrane 6 as represented in FIG. 6, or upstream of this closure membrane 6. In the first case (inner fixed structure at the level of the membrane), the deployed closure membrane closes only an annular section including the secondary flow path so that only the cold air flow is deflected in reverse jet (see FIG. 14). In the second case (inner fixed structure upstream of the closure membrane), the deployed closure membrane closes a circular section so that the two cold and hot flows are deflected in reverse jet (see FIG. 19).

FIG. 5 shows the thrust reverser in the direct jet position. FIG. 6 shows the thrust reverser in the reverse jet position. The fixed structure 43 is fixed relative to the element 71, that is to say relative to the intermediate section 7 of the nacelle and relative to the turbojet engine.

In the direct jet position (FIGS. 5 and 11), the movable structure 42 is advanced towards the element 71. The closure membrane(s) 6 are retracted, that is to say that they do not close the flow path so as to deflect at least one portion of the air flow in the direction of the blade cascades 41. For example, the closure membrane(s) 6 can be housed between an inner wall 421 of the movable structure 42 and an outer wall of this movable structure 42.

In the reverse jet position (FIGS. 6 and 14), the movable structure 42 is moved back relative to the element 71. The closure membranes 6 are deployed in the flow path, that is to say that they are arranged to deflect at least one portion of the air flow in the direction of the blade cascades 41.

To be able to deploy the closure membrane(s) 6 in the flow path, a portion of the closure membrane(s) 6 is fixed to the fixed structure 43 and another portion of the closure membrane(s) 6 is fixed to an intermediate structure 44 of the thrust reverser.

The intermediate structure 44 is movable in rotation relative to the fixed structure 43, about an axis coincident with the longitudinal direction D1 (see FIG. 6).

In the form of FIGS. 5 and 6, the intermediate structure 44 cooperates with the movable structure 42 of the thrust reverser so that the translation of the movable structure 42 drives the intermediate structure 44 in rotation. In this example, this cooperation is carried out via a rack system.

The rack system in this example comprises a first gear element 45 secured to the movable structure 42 movable in translation in the longitudinal direction D1. This first gear element 45 can be of the toothed bar type. This rack system further comprises a second gear element 46 of the toothed pinion type.

When the movable structure 42 and therefore the first gear element 45 is displaced from the direct jet position (FIG. 5) to the reverse jet position (FIG. 6), the second gear element 46 is rotatably driven by the translation of the first gear element 45.

In this example, the intermediate structure 44 cooperates with the second gear element 46 so that the rotation of the second gear element 46 drives the intermediate structure 44 in rotation relative to the fixed structure 43. The intermediate structure 44 can be of the toothed crown type.

The portion of the closure membrane(s) 6 fixed to the intermediate structure 44 is therefore driven in rotation relative to the portion of the closure membrane(s) 6 fixed to the fixed structure 43.

During the translation of the movable structure 42 from the direct jet position to the reverse jet position, the closure membrane(s) 6 thus undergo a deformation allowing them to be deployed in the flow path (see for example FIGS. 11 to 14) so as to deflect at least one portion of the air flow which circulates there in the direction of the blade cascades 41.

In another non-represented form, the closure membrane(s) 6 can be driven in rotation by winding a cable or a belt about a crown.

The closure membrane(s) 6 typically assume a hyperboloidal shape when they are deployed in the flow path.

Figure 15:
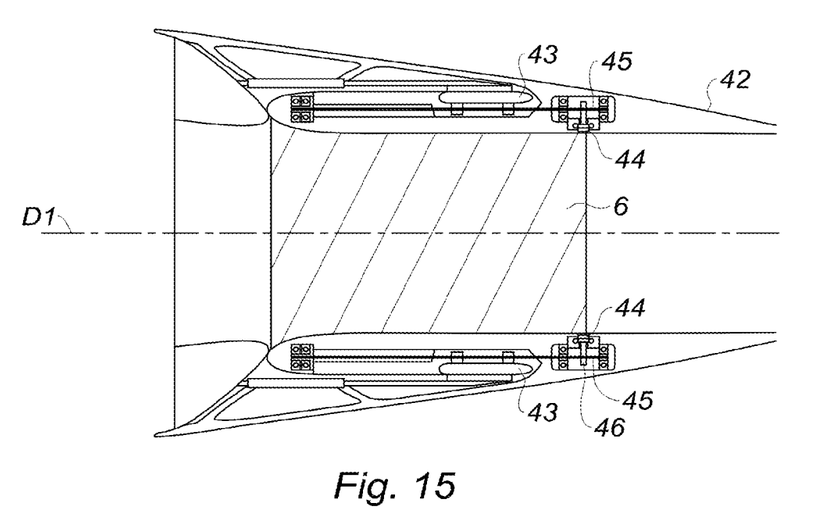
FIG. 15 is a schematic and partial view in longitudinal section of a thrust reverser in a direct jet position, with mechanical drive of the closure membrane, in accordance with teachings of the present disclosure.

When the thrust reverser comprises several closure membranes, for example two closure membranes 6A and 6B as represented in FIGS. 14 and 15, these closure membranes can partially cover each other or superimpose when they are deployed in the flow path. In the example of FIGS. 13 and 14, the closure membranes 6A and 6B are partially superimposed one on the other in a region 6R located opposite the islet 431 (see hereinbelow).

In order not to irreversibly deform or break the at least one closure membrane 6, the closure membrane can be elastic.

In the example of FIGS. 11 to 14, the inner portion of the fixed structure 43 is connected to an outer portion of the fixed structure of the thrust reverser via an islet 431. This islet 431 inhibits the deployment of the closure membranes 6A and 6B in a region situated around this islet since the closure membranes cannot be deployed through the islet 431.

In one form, in order to close this region of the flow path in reverse jet, that is to say on either side of the islet 431, the thrust reverser may comprise flaps 432 and 433 movable between the direct jet position and the reverse jet position. In direct jet (FIG. 11), the flaps are retracted so as to allow the cold air flow to circulate on both sides of the islet 431. In reverse jet (FIG. 14), the flaps 432 and 433 are deployed so as to close the region located around the islet 431 and so as to close, with the closure membranes 6A and 6B, the entire secondary flow path.

The actuation of the flaps 432 and 433 can be carried out according to any known technique, for example using connecting rods (not represented) housed in the movable structure 42.

Figure 7:
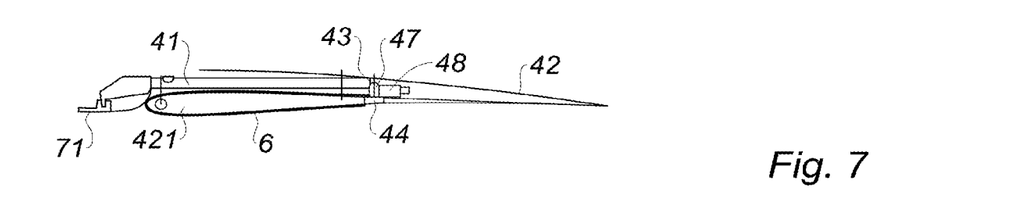
FIG. 7 is a schematic and partial view in longitudinal section of a thrust reverser in the direct jet position, with electric or hydraulic drive of the membrane, in accordance with teachings of the present disclosure.
Figure 8:
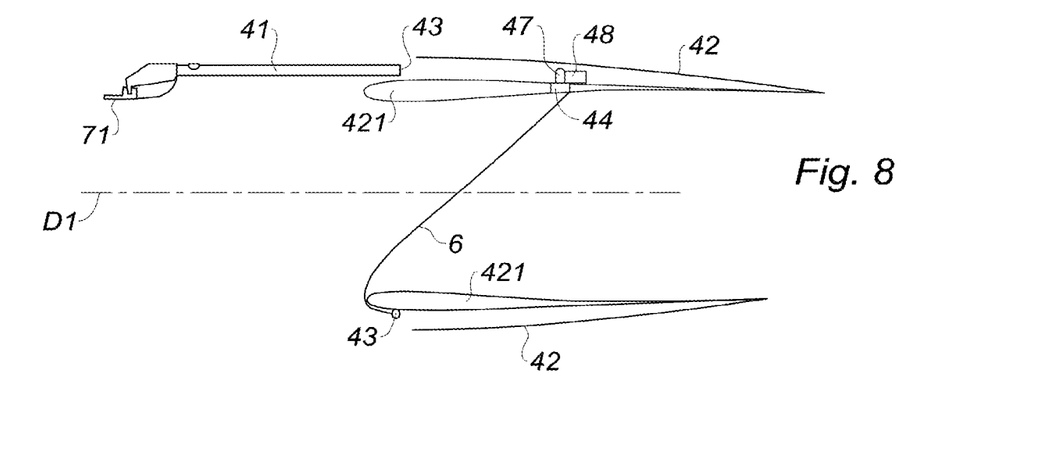
FIG. 8 is a schematic and partial view in longitudinal section of the thrust reverser of FIG. 7 in reverse jet position.

The form of FIGS. 7 and 8 is described by difference with the form of FIGS. 5 and 6.

In this example, the rotation of the intermediate structure 44 is controlled by a first actuation device 48 of the electric or hydraulic motor type, for example via a gear element 47.

This first actuation device 48 is independent of a second actuation device (not represented) which controls the translation of the movable structure 42.

According to a first variant, the first actuation device 48 and the second actuation device are simultaneously implemented to simultaneously control the rotation of the intermediate structure 44 and the translation of the movable structure 42, similarly to the form of FIGS. 5 and 6.

According to a second variant, the first actuation device 48 and the second actuation device are successively implemented. For example, to pass from the direct jet position to the reverse jet position, the rotation of the intermediate structure 44 can be carried out after initiation of the translation of the movable structure 42, either before or after arrival of the movable structure 42 in the retracted position illustrated in FIG. 8.

Other systems for deploying the at least one closure membrane 6 can be envisaged without departing from the scope of the present disclosure, for example the systems described below with reference to FIGS. 9 and 10.

Figure 9:
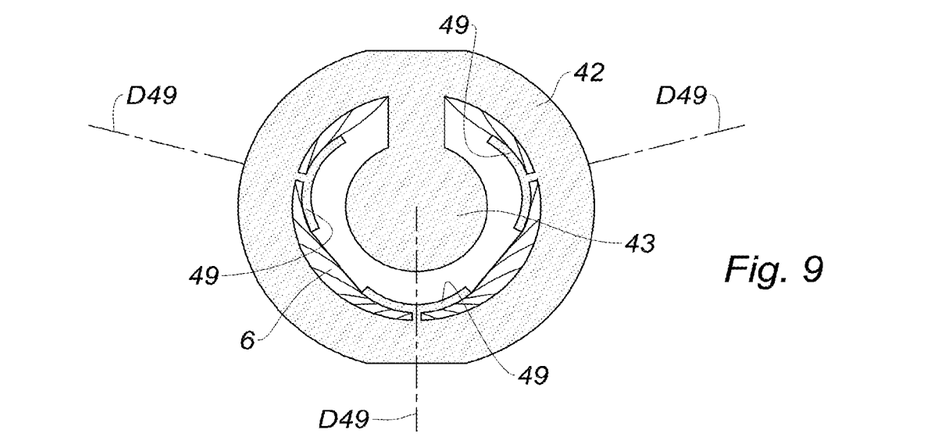
FIG. 9 schematically represents a thrust reverser where deployment of at least one closure membrane in the flow path is carried out by constricting one portion of the membrane, in accordance with teachings of the present disclosure.

In the form of FIG. 9, the deployment of the at least one closure membrane 6 in the flow path is carried out by constricting one portion of the closure membrane 6.

To do this, one or more portions of the closure membrane 6 can be secured to one or more holding elements 49 movable between a folded position and a closure position. In the closure position, the closure membrane 6 includes an at least partial transverse partition in the flow path (reverse jet). In the folded position, the closure membrane 6 does not interfere with the air flow circulating in the flow path (direct jet).

In the example of FIG. 9, the thrust reverser comprises three holding elements 49 connected to the movable structure 42. These holding elements 49 are movable in a respective radial direction D49. FIG. 9 shows the closure membrane 6 partially deployed, the holding elements 49 being placed in an intermediate position between the folded position and the closure position.

Figure 10:
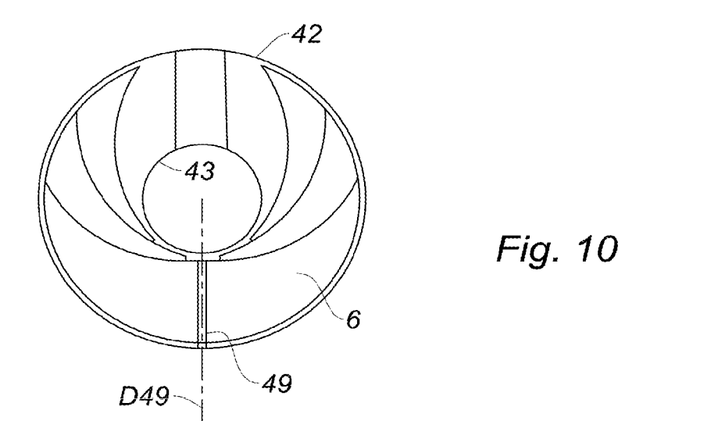
FIG. 10 schematically represents a thrust reverser where deployment of the at least one closure membrane in the flow path is carried out by translation of a holding element along a radial direction, in accordance with teachings of the present disclosure.

In the form of FIG. 10, the deployment of the at least one closure membrane 6 in the flow path is carried out by translation of a holding element 49 along a radial direction D49. A portion of the closure membrane 6 being secured to this holding element 49 and another portion being secured to the movable structure 42 or any other element of the thrust reverser not secured to the holding element 49, the translation of the latter makes it possible to at least partially close the flow path.

Other forms are described below with reference to FIGS. 15 to 19. These forms are in particular provided for redirecting both the cold air flow and the hot air flow towards the evacuation structure in reverse jet.

Figure 16:
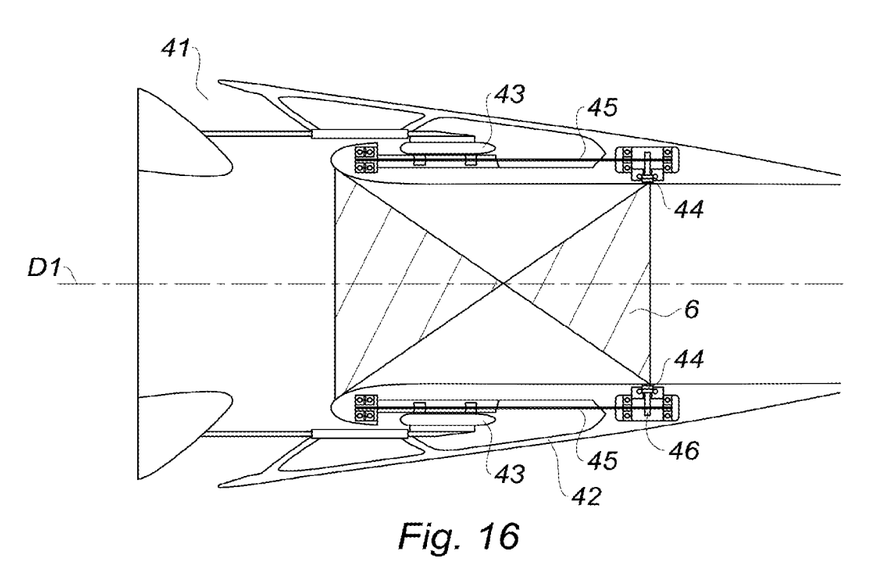
FIG. 16 is a schematic and partial view in longitudinal section of the thrust reverser of FIG. 15 in a reverse jet position.
Figure 17:
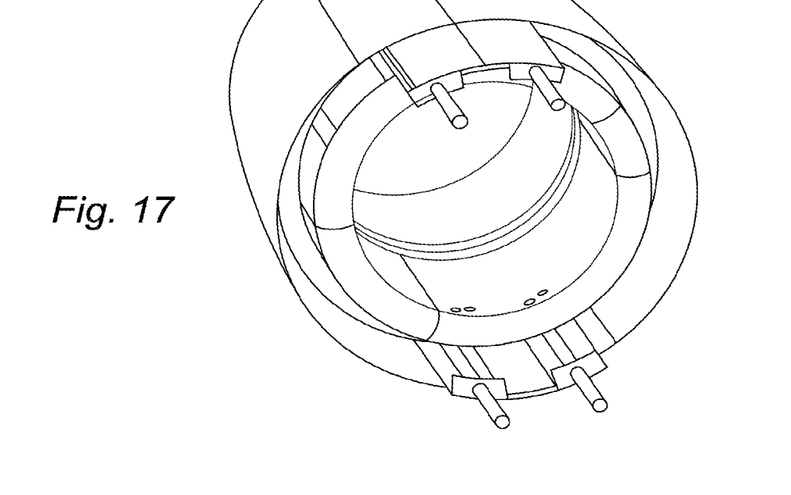
FIG. 17 is a schematic perspective view of a thrust reverser in a direct jet position, in accordance with teachings of the present disclosure.
Figure 18:
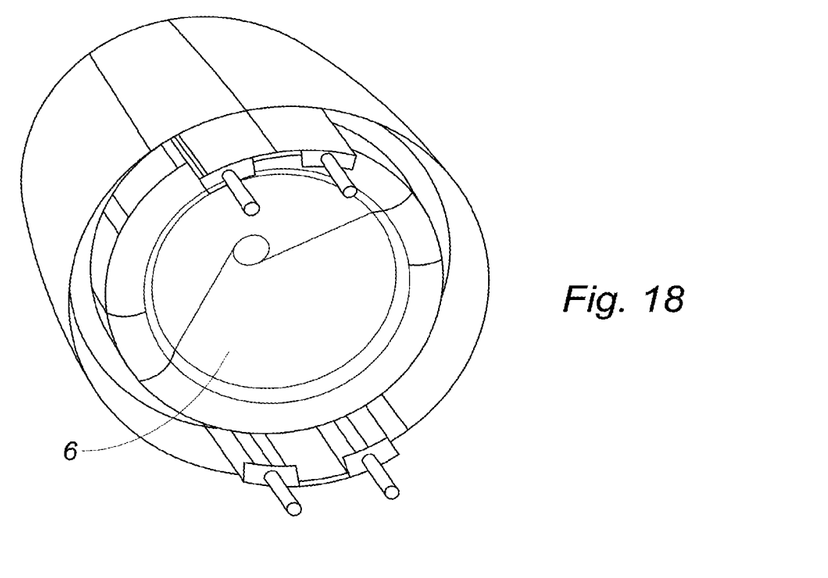
FIG. 18 is a schematic perspective view of the thrust reverser of FIG. 17 in a reverse jet position.
Figure 19:
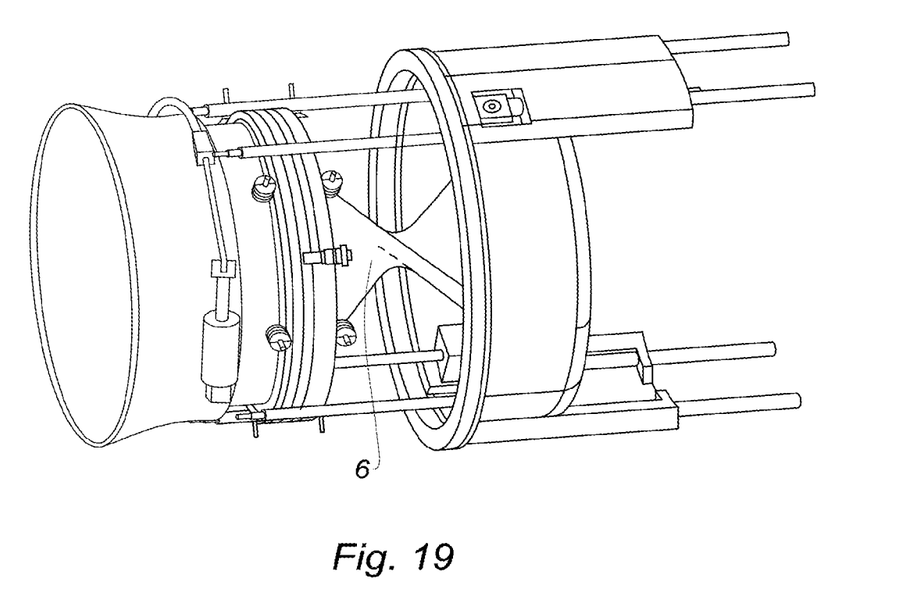
FIG. 19 is a schematic perspective view of a thrust reverser in a reverse jet position, in accordance with teachings of the present disclosure.

FIGS. 15 and 17 show thrust reversers in the direct jet position. FIGS. 16, 18, and 19 show thrust reversers in the reverse jet position. As in the thrust reverser of FIGS. 5 and 6, the inner portion of the fixed structure 43 is not represented, the latter being in these examples located upstream of the deployed closure membrane.

In direct jet (FIGS. 15 and 17), the closure membrane 6 is retracted. In reverse jet (FIGS. 16, 18, and 19), the movable structure 42 is in the receded position relative to the fixed structure 43. The closure membrane 6 is deployed, that is to say that they are arranged to deflect at least one portion of the air flow, in this case the bypass hot and cold air, in the direction of the evacuation structure 41.

In this example, the evacuation structure 41 does not comprise blade cascades and has simple openings. In other forms not represented, the evacuation structure 41 could comprise blade cascades on all or part of the openings.

To be able to deploy the closure membrane 6, a portion of the closure membrane 6 is fixed to the fixed structure 43 and another portion of the closure membrane 6 is fixed to an intermediate structure 44 of the thrust reverser.

The intermediate structure 44 is movable in rotation relative to the fixed structure 43, about an axis coincident with the longitudinal direction D1 (see FIG. 15).

In the form of FIGS. 15 and 16, the intermediate structure 44 cooperates with the movable structure 42 of the thrust reverser so that the translation of the movable structure 42 drives the intermediate structure 44 in rotation. In this example, this cooperation is carried out by a rack system.

The rack system in this example comprises a first gear element 45 secured to the movable structure 42 movable in translation in the longitudinal direction D1. This first gear element 45 can be of the toothed bar type. This rack system further comprises a second gear element 46 of the toothed pinion type.

When the movable structure 42 and consequently the first gear element 45 are displaced from the direct jet position (FIG. 15) to the reverse jet position (FIG. 16), the intermediate structure 44 is driven in rotation by the action of the second gear element 46 under the effect of the translation of the first gear element 45.

The portion of the closure membrane 6 fixed to the intermediate structure 44 is therefore driven in rotation relative to the portion of the closure membrane 6 fixed to the fixed structure 43.

During the translation of the movable structure 42 from the direct jet position to the reverse jet position, the closure membrane 6 thus undergoes a deformation allowing it to be deployed in the flow path of the nacelle (see for example FIGS. 18 to 19) so as to deflect at least one portion of the air flow which circulates therein in the direction of the evacuation structure 41.

Of course, the present disclosure is not limited to the examples which have just been described and numerous modifications can be made to these examples without departing from the scope of the present disclosure.

For example, the thrust reverser may comprise a holding element driving a portion of the at least one membrane in a circumferential direction in the flow path along an annular slide provided in the movable portion of the thrust reverser, the thrust reverser of FIG. 9 or 10 may comprise several closure membranes deployed and retracted according to the principle described above with reference to this figure, the evacuation structure may comprise blade cascades which extend over a first longitudinal portion (in the direction D1) and a free opening, not provided with blade cascades, which extend over a second longitudinal portion (not represented), and the evacuation structure can be devoid of blade cascades and comprise, or in one form consist of, one or more free radial openings (not represented).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for an aircraft propulsion unit, comprising an evacuation structure comprising one or more openings, a movable structure and a fixed structure, the movable structure and the fixed structure delimiting a flow path capable of channeling an air flow in a longitudinal direction (D1) when the thrust reverser is in a direct jet position, the movable structure being movable between the direct jet position and a reverse jet position providing a radial evacuation of at least one portion of the air flow through the evacuation structure, wherein the thrust reverser comprises at least one closure membrane arranged to deflect at least one portion of the air flow in a direction of the evacuation structure when the thrust reverser is in the reverse jet position and an intermediate structure movable in rotation relative to the fixed structure about an axis coincident with the longitudinal direction (D1), a portion of the at least one closure membrane being fixed to the fixed structure, another portion of the at least one closure membrane being fixed to the intermediate structure.

2. The thrust reverser according to claim 1, wherein the intermediate structure cooperates with the movable structure so that a displacement of the movable structure from the direct jet position to the reverse jet position drives the intermediate structure in rotation about the axis coincident with the longitudinal direction (D1).

3. The thrust reverser according to claim 2, comprising a rack system, the intermediate structure cooperating with the movable structure via the rack system.

4. The thrust reverser according to claim 1, comprising an actuation device arranged to drive the intermediate structure in rotation about the axis coincident with the longitudinal direction (D1).

5. The thrust reverser according to claim 1, comprising one or more holding elements respectively secured to one or more portions of the at least one closure membrane, the one or more holding elements being movable in translation along a radial direction between a folded position, in which the at least one closure membrane does not close the flow path, and a closure position in which the at least one closure membrane is arranged to deflect the at least one portion of the air flow in the direction of the evacuation structure.

6. An aircraft propulsion unit comprising the thrust reverser according to claim 1.

* * * * *